United States Patent
Yamaguchi

(10) Patent No.: US 7,135,681 B2
(45) Date of Patent: Nov. 14, 2006

(54) SIGNAL DETECTION METHOD AND APPARATUS

(75) Inventor: Akira Yamaguchi, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 230 days.

(21) Appl. No.: 10/960,292

(22) Filed: Oct. 8, 2004

(65) Prior Publication Data
US 2005/0098725 A1   May 12, 2005

(30) Foreign Application Priority Data
Oct. 10, 2003   (JP)   ............................. 2003-352184

(51) Int. Cl.
*G01T 1/00*   (2006.01)
(52) U.S. Cl. ................................. 250/336.1
(58) Field of Classification Search ............. 250/336.1
See application file for complete search history.

(56) References Cited

U.S. PATENT DOCUMENTS

2002/0113211 A1* 8/2002 Nygard et al. ........... 250/336.1
2004/0027183 A1* 2/2004 Binkley ...................... 327/172
2004/0195512 A1* 10/2004 Crosetto ................ 250/363.04

OTHER PUBLICATIONS

R. B. Apte, et al. "Large-Area, Low-Noise Amorphous Silicon Imaging System", SPIE, vol. 3301, pp. 2-8, 1998.

* cited by examiner

*Primary Examiner*—David Porta
*Assistant Examiner*—Christopher Webb
(74) *Attorney, Agent, or Firm*—Sughrue Mion, PLLC

(57) ABSTRACT

A signal detecting method and apparatus capable of performing rapid signal reading with the resultant image signal of improved signal-to-noise ratio, in which a charge signal outputted from a radiation image detector is integrated by an integral amplifier, and the integrated electrical signal is passed through a low pass filter to detect it as an image signal. The transient response time of the low pass filter is reduced and a sufficient integration time is secured by altering the time constant of the low pass filter by the time constant altering means such that the time constant during the time period between resetting of the integral amplifier and initiation of the next integration is set smaller than that during the time period between the initiation of the inputting of the integrated electrical signal to the low pass filter and holding of the filtered electrical signal.

5 Claims, 3 Drawing Sheets

SIGNAL DETECTION METHOD AND APPARATUS

BACKGROUND OF THE INVENTION

1. Field of the Invention

The present invention relates to a signal detection method and apparatus for detecting a charge signal outputted from a radiation image detector, which is configured to receive radiation carrying a radiation image to record the image therein, as an image signal representing the radiation image by integrating the charge signal outputted from the detector with an integral amplifier and passing the integrated electrical signal through a low pass filter.

2. Description of the Related Art

Various types of radiation image detectors configured to receive radiation transmitted through a subject to record the radiation image of the subject and to output a charge signal in accordance with the image recorded therein have been proposed and put into practical use in the medical and other industrial fields.

One such detector uses a semiconductor material that will generate charges when exposed to radiation. Another type of such detector uses a storage phosphor sheet made of storage phosphor that will store radiation energy when exposed to radiation and emit stimulated luminescence when irradiated by reading light.

As for examples of the radiation image detectors using a semiconductor material described above, a so-called optical reading system that will read out the charge signal through the scanning of linear reading light, and a so-called TFT system that will read out the charge signal through on-off switching of TFT switches arranged two dimensionally have been proposed. In one of the radiation image detectors that use the storage phosphor sheet, the charge signal will be read out by receiving stimulated luminescence emitted through the irradiation of the reading light from the storage phosphor sheet with a linear sensor having photoelectric conversion elements arranged lineally, and converting the stimulated luminescence received by the sensor to an electrical signal through photoelectric conversion at the linear sensor.

Then, as described, for example, in the non-patent document entitled "Large-Area, Low-Noise Amorphous Silicon Imaging System" (R. B. Apte et al., SPIE Vol. 3301, p. 2–p. 8, 1998), the charge signal outputted from the radiation image detector is integrated by the integral amplifier (also referred to as "charge amplifier" as it amplifies charges) connected at the latter stage and detected as an image signal representing the radiation image. The wide use of the integral amplifier is due to the fact that it is easier to obtain a high sensitivity with ease of integration in manufacturing compared with I–V amplifiers and the like because of its circuit configuration.

Here, the amount of noise $Q_N$ of the integral amplifier described above is express by the following formula:

$$Q_N = Q_o + C_{in}\sqrt{\frac{kT}{g_m}\left(f_N - \frac{1.8}{t_s}\right)}$$

where:
k: Boltzmann constant
T: absolute temperature
$Q_O$: fixed noise component
$t_S$: sampling time
$f_N$: noise bandwidth, for 1—pole LPF, $$f_N = \frac{1}{4\tau}$$

τ : time constant
$C_{in}$: total input capacitance
$g_m$: transconductance of integral amplifier Thus, in order to reduce the noise, $f_N$ needs to be minimized, that is, the time constant τ of the low pass filter connected at the latter stage of the integral amplifier needs to be increased. In particular, the radiation image detectors of the optical reading system and those that use the storage phosphor sheet described above are slow in responding to reading light, requiring a longer sampling time $t_s$, whereby $f_N$ needs to be further reduced.

However, the increase in the time constant τ of the low pass filter connected at the latter stage of the integral amplifier results in a longer transient response time of the low pass filter when integral amplifier is reset to discharge the charges integrated therein. Thus, if the signal reading needs to be completed within a predetermined sequence time, a less time may be allowed for the irradiation of reading light and the charge signal read out from the radiation image detector becomes inevitably small, resulting in degradation of the signal-to-noise ratio. On the other hand, if a predetermined signal-to-noise ratio is to be maintained, a certain time period needs to be secured as the irradiation time of the reading light. This requires a longer sequence time, thus resulting in a longer reading time for reading out the radiation image.

SUMMARY OF THE INVENTION

In recognition of the circumstance described above, it is an object of the present invention to provide a signal detecting method and apparatus capable of performing rapid signal reading with the resultant image signal of improved signal-to-noise ratio, in which a charge signal outputted from a radiation image detector, which is configured to receive radiation carrying a radiation image to record the image therein, is detected as an image signal representing the radiation image by integrating the charge signal outputted from the detector with an integral amplifier and passing the integrated electrical signal through a low pass filter.

The signal detecting method of the present invention is a signal detecting method for detecting a charge signal outputted from a radiation image detector, which is configured to receive radiation carrying a radiation image to record the image therein and to output a charge signal in accordance with the image recorded therein, as an image signal representing the radiation image, the method comprising the steps of:

(1) integrating the charge signal outputted from the radiation image detector with an integral amplifier, (2) inputting the integrated electrical signal to a low pass filter, (3) holding the filtered electrical signal outputted from the low pass filter with a sample/hold circuit to detect the filtered electrical signal as an image signal representing the radiation image, (4) resetting the integral amplifier, and (5) repeating the steps (1) to (4), wherein the time constant of the low pass filter is altered such that the time constant during the time period between the resetting of the integral amplifier and the initiation of the next integration is set smaller than that during the time period between the initiation of the inputting of the integrated electrical signal to the low pass filter and the holding of the filtered electrical signal.

The signal detecting apparatus of the present invention comprises:

an integral amplifier for integrating a charge signal outputted from a radiation image detector configured to receive radiation carrying a radiation image to store the image therein and to output a charge signal in accordance with the image recorded therein, a low pass filter for receiving the integrated electrical signal and outputting a filtered electrical signal through filtering of the integrated electrical signal, a sample/hold circuit for holding the filtered electrical signal outputted from the low pass filter to detect the filtered electrical signal as an image signal representing the radiation image, a control circuit for outputting control signals for resetting the integral amplifier after the filtered electrical signal is held by the sample/hold circuit and repeating the steps of the integration by the integral amplifier to the resetting of the integral amplifier, and a time constant altering means for altering the time constant of the low pass filter such that the time constant during the time period between the resetting of the integral amplifier and the initiation of the next integration is set smaller than that during the time period between the initiation of inputting of the integrated electrical signal to the low pass filter and the holding of the filtered electrical signal.

In the signal detecting apparatus described above, the time constant altering means may comprise an analog switch arranged in parallel to at least one of the resistor elements comprising the low pass filter.

Further, in the signal detecting apparatus described above, a charge signal outputted from the radiation image detector through the scanning of the detector with reading light may be used as the charge signal outputted from the radiation image detector described above.

According to the signal detecting method and apparatus of the present invention, in repeating the steps of integrating a charge signal outputted from a radiation image detector with an integral amplifier; inputting the integrated electrical signal to a low pass filter; holding the filtered electrical signal outputted from the low pass filter with a sample/hold circuit to detect the filtered electrical signal as an image signal representing the radiation image; and resetting the integral amplifier, the time constant of the low pass filter is altered by a time constant altering means such that the time constant during the time period between the resetting of the integral amplifier and the initiation of the next integration is set smaller than that during the time period between the initiation of the inputting of the integrated electrical signal to the low pass filter and the holding of the filtered electrical signal. This arrangement may reduce the transient response time of the low pass filter during the time period between the resetting of the integral amplifier and the initiation of the next integration. Thus, a sufficient time for the integration is secured and rapid signal reading may be realized with the resultant image signal of improved signal-to-noise ratio.

Further, when the time constant altering means of the signal detecting apparatus described above is comprised of an analog switch provided in parallel to at least one of the resistor elements comprising the low pass filter, the time constant may be altered by the simple mechanism.

Still further, when a charge signal outputted from a radiation image detector through the scanning of the detector with reading light is used, more significant effect described above may be obtained as the radiation image detector of the optical reading system is particularly slow in responding to the reading light and outputting a charge signal representing the radiation image.

DESCRIPTION OF THE PREFERRED EMBODIMENTS

Figure 1:
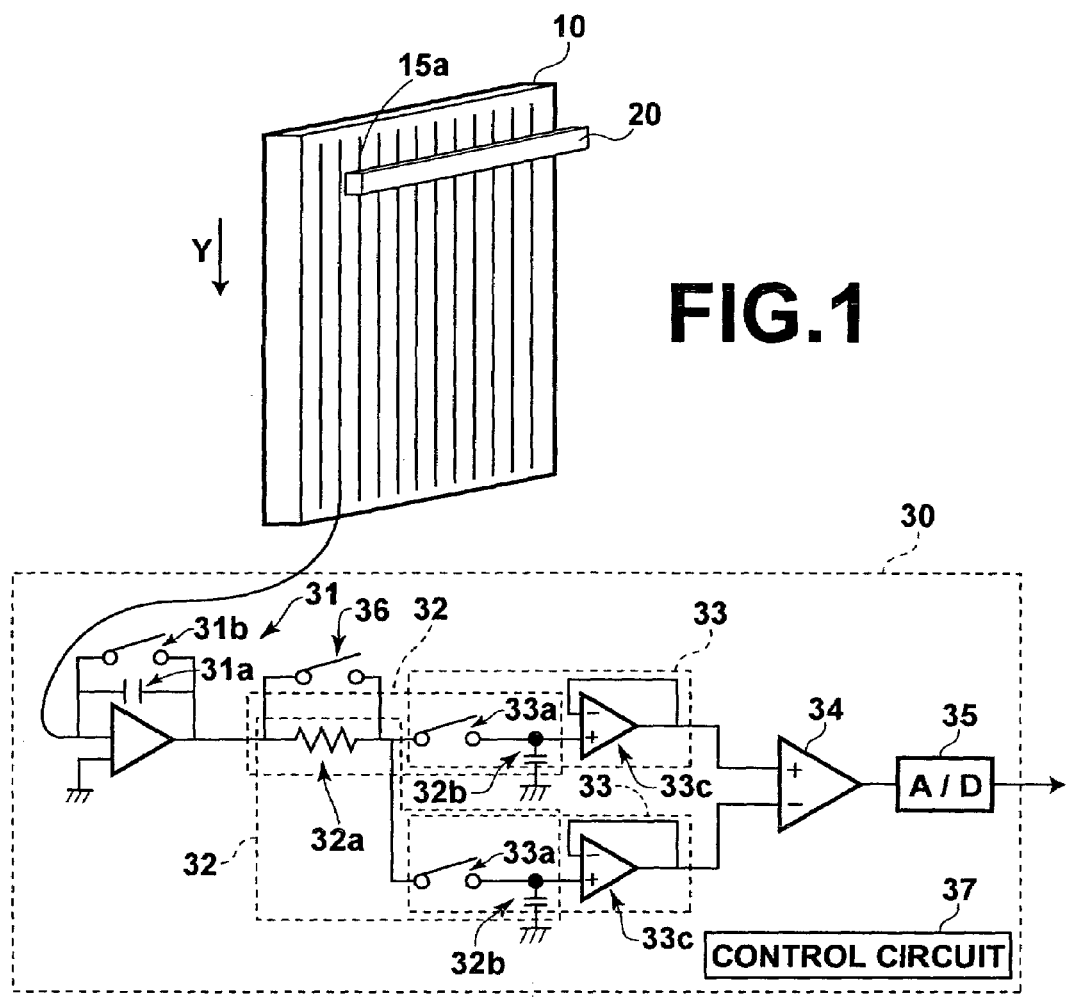
FIG. 1 is a schematic configuration diagram of a radiation image recording/reading apparatus that employs an embodiment of the signal detecting apparatus of the present invention.

Hereinafter, the radiation image recording/reading apparatus that employs an embodiment of the signal detecting apparatus configured to implement the signal detecting method of the present invention will be described in detail with reference to the accompanying drawings. FIG. 1 is a schematic configuration diagram of a radiation image recording/reading apparatus that employs an embodiment of the signal detecting apparatus of the present invention.

The radiation image recording/reading apparatus described above comprises: a radiation source which is not shown in the drawing; a radiation image detector 10 configured to receive radiation released from the radiation source and transmitted through a subject to record the radiation image of the subject therein and to output a charge signal in accordance with the radiation image recorded therein; a reading light source section 20 for scanning the radiation image detector 10 with linear reading light; a signal detecting apparatus 30 for outputting a digital image signal in proportion to the radiation image described above based on the charge signal outputted from the radiation image detector 10 through the scanning of the reading light by the reading light source section 20.

The signal detecting apparatus 30 comprises: an integral amplifier 31 for integrating the charge signal outputted from the radiation image detector 10; a low pass filter 32 for receiving the electrical signal integrated by the integral amplifier 31; two sample/hold circuits 33 for holding the filtered electrical signal outputted from the low pass filter 32; a differential amplifier 34 for outputting the difference between the two filtered electrical signals held by the two sample/hold circuits 33; and an A/D converter 35 for converting an analog signal outputted from the differential amplifier 34 to a digital signal.

The integral amplifier 31 has a capacitor 31a for storing the charge signal outputted from the radiation image detector 10 and a rest switch 31b for discharging the charge signal stored in the capacitor 31a.

The low pass filter 32 has a resistor element 32a and a capacitor 32b. The time constant τ of the low pass filter 32 is determined by the product of the resistance R of the resistor element 32a and the capacitance C of the capacitor 32b, that is τ=R·C.

Here, the signal detecting apparatus 30 of this embodiment has a time constant altering means 36 for altering the time constant τ of the low pass filter 32. The time constant altering means 36 has a switch arranged in parallel to the resistor element 32a comprising the low pass filter 32, and the time constant τ of the low pass filter 32 is altered through the switching of this switch on and off.

For example, the time constant τ of the low pass filter 32 may be obtained by the following formula, letting RON be a resistance of the switch 36 when it is switched on and $R_{OFF}$ be the resistance of the resistor element 32a comprising the low pass filter 32:

$$\tau = R \cdot C$$
$$= (R_{OFF} \cdot R_{ON} / R_{OFF} + R_{ON}) \cdot C$$
$$= \{R_{ON} / (1 + (R_{ON} / R_{OFF}))\} \cdot C$$
$$\approx R_{ON} \cdot C$$

Where, it is assumed that $R_{ON} << R_{OFF}$.

For example, letting $R_{OFF}$=10 KΩ and $R_{ON}$=1 Ω, the ratio of the time constant τ when the switch described above is switched on and that when it is switched off is $R_{ON}/R_{OFF}$=1/10000. This means that when the switch is switched on, the low pass filter 32 settles 10000 times faster than when it is switched off.

The sample/hold circuit 33 has a switch 33a, a capacitor 32b for storing the filtered electrical signal outputted from the low pass filter 32, and a buffer amplifier 33c for outputting the filtered electrical signal stored in the capacitor 32b.

As described above, the capacitor 32b of the signal detecting apparatus 30 according to this embodiment is shared by the low pass filter 32 and the sample/hold circuit 33, that is, it forms a part of the low pass filter 32 and also a part of the sample/hold circuit.

The operational timings of the reset switch 31b of the integral amplifier 31, the switch of the time constant altering means 36, the switch 33a of the sample/hold circuit 33, A/D converter and the like are controlled by the control signals outputted from the control circuit 37.

Figure 2:
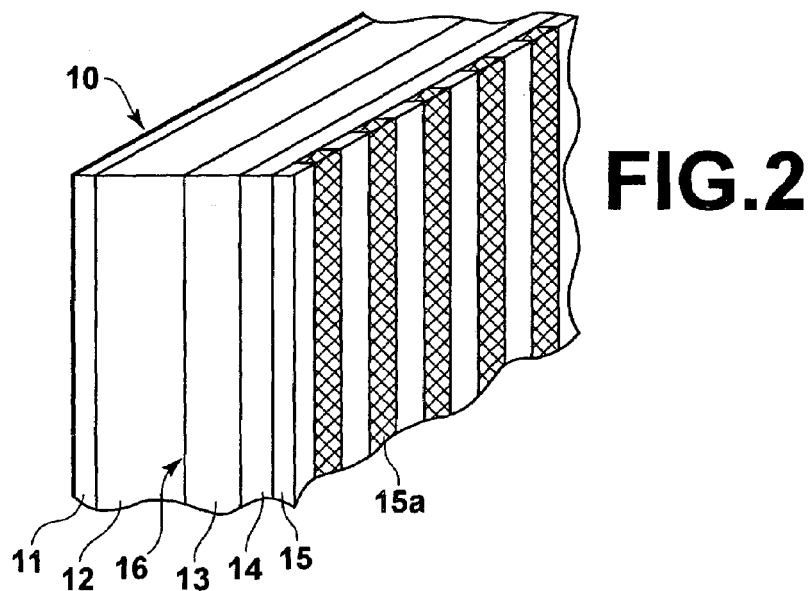
FIG. 2 is a schematic configuration diagram of the radiation image detector of the radiation image recording/reading apparatus shown in FIG. 1.

As shown in FIG. 2, the radiation image detector 10 specifically comprises a set of layers layered in the order of a first electrode layer 11 which is transparent to radiation carrying a radiation image; a recording photoconductive layer 12 configured to generate charges by receiving the radiation transmitted through the first electrode layer 11; a charge transport layer 13 configured to act as an insulator against the charges generated in the recording photoconductive layer 12 and as a conductor for the transport charges having the opposite polarity to that of the charges generated in the recording photoconductive layer 12; a reading photoconductive layer 14 configured to generate charges by receiving the reading light; and a second electrode layer 15 comprising linear electrodes 15a disposed in parallel, the electrode 15a being transparent to the reading light and extending linearly, wherein the storage section for storing the charges generated in proportion to the dose of radiation is formed at the interface between the recording photoconductive layer 12 and charge transport layer 13.

In FIG. 1, only the signal detecting apparatus 30 connected to one of the linear electrodes 15a of the radiation image detector 10 is shown and other signal detecting apparatuses 30 connected to other linear electrodes are not included in the drawing to facilitate the description.

The A/D converter 35 may be provided for each of the linear electrodes 15a, or a single A/D converter 35 may be shared by them by providing a multiplexer, in which the analog signals outputted from the differential amplifiers 34 of the respective linear electrodes 15a are switched and inputted to the single A/D converter 35.

The radiation image detector 10 and the reading light source section 20 are disposed such that the longitudinal direction of the reading light source of the reading light source section 20 is substantially orthogonal to the longitudinal direction of the linear electrodes 15a of the radiation image detector 10. The reading light source 20 scans the reading light by moving the linear reading light source in the longitudinal direction of the linear electrodes 15a, but the moving mechanism for moving the reading light source is not included in the drawing to facilitate the description.

Hereinafter, the operation of the aforementioned radiation image recording/reading apparatus will be described.

Figure 3A:
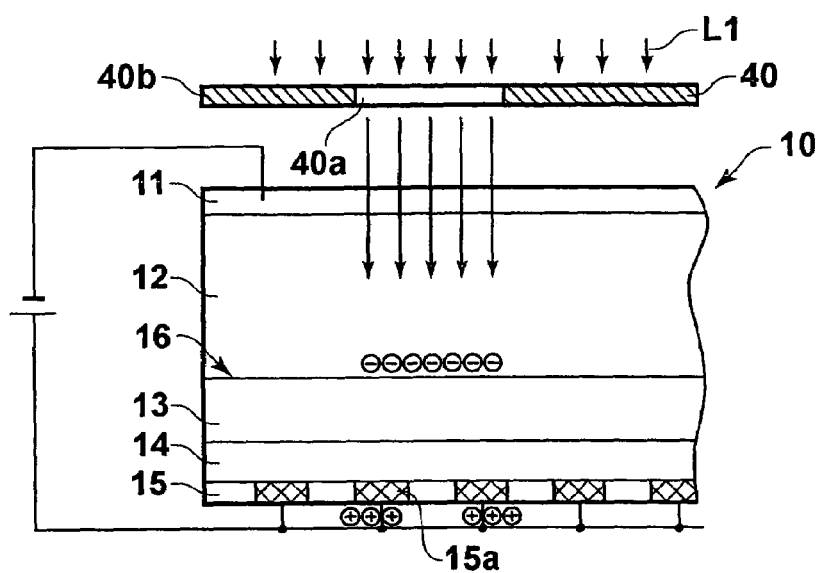
FIG. 3A is a drawing for illustrating the operation of the radiation image detector of the radiation image recording/reading apparatus shown in FIG. 1.

First, radiation L1 is irradiated on a subject 40 from the radiation source with a voltage being applied to the radiation image detector 10 such that the first electrode layer 11 is charged negatively and the second electrode layer 15 is charged positively. As shown in FIG. 3A, the radiation L1 released from the radiation source is irradiated across the subject 40, and a portion of the radiation transmitted through a transparent section 40a of the subject 40, which transmits the radiation, is irradiated on the radiation image detector from the side of the first electrode layer 11. The other portion of the radiation irradiated on the opaque section 40b of the subject 40, which blocks the radiation, is not irradiated on the radiation image detector 10.

The radiation L1 irradiated on the radiation image detector 10 is transmitted through the first electrode layer 11 and irradiated on the recording photoconductive layer 12, which causes charge-pairs to be generated in the recording photoconductive layer 12. The positive charges of the charge-pairs so generated will be moved to the negatively charged first electrode layer 11 where they will couple with the negative charges and disappear, while the negative charges of the charge-pairs will be stored as the charges of the latent image in a storage section 16 formed at the interface between the recording photoconductive layer 12 and charge transport layer 13. In this way, the radiation image is recorded in the radiation image detector 10.

Figure 3B:
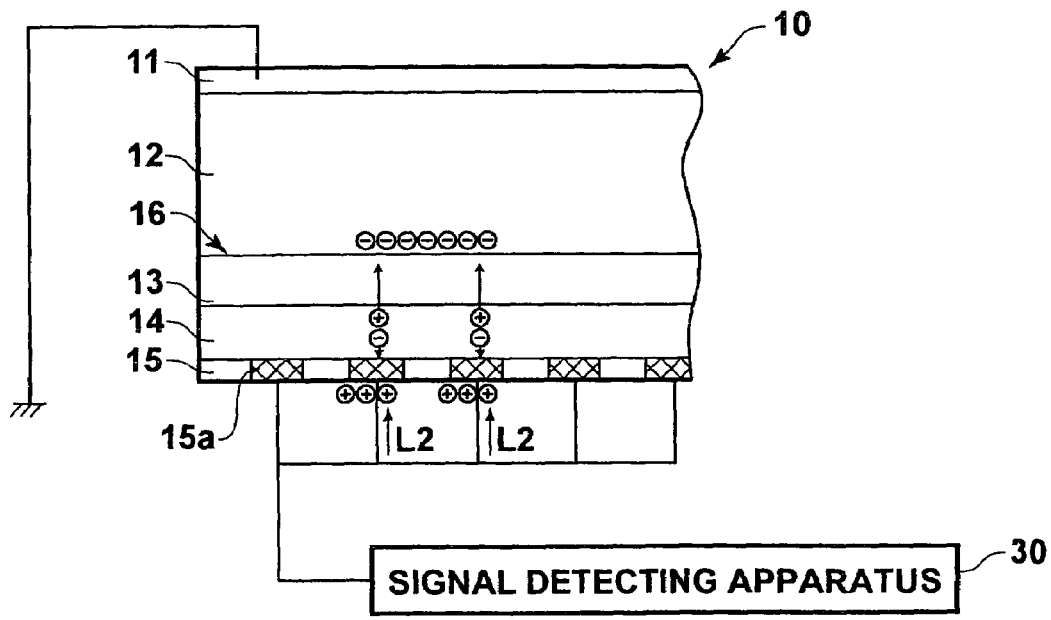
FIG. 3B is a drawing for illustrating the operation of the radiation image detector of the radiation image recording/reading apparatus shown in FIG. 1.

Thereafter, as shown in FIG. 3B, reading light L2 is irradiated on the radiation image detector 10 from the side of the second electrode layer 15 with the first electrode layer 11 being grounded. The reading light L2 is transmitted through the linear electrodes 15a and irradiated on the reading photoconductive layer 14. The positive charges of the charge-pairs generated in the reading photoconductive layer 14 by the irradiation of the reading light L2 couple with the charges of the latent image stored in the storage section 16, while the negative charges of the charge-pairs couple with the positive charges charged on the linear electrodes 15a of the second electrode layer 15.

In the mean time, while the reading light is being irradiated, the reset switch 31b of the integral amplifier 31 in the signal detecting apparatus 30 is maintained open, and the negative charges generated in the reading photoconductive layer 14 couple with the positive charges charged on the linear electrodes 15a of the second electrode layer 15 in the manner as described above. This causes the electrical signal to be stored in the capacitor 31a of the integral amplifier 31 in proportion to the amount of coupled charges.

Figure 4:
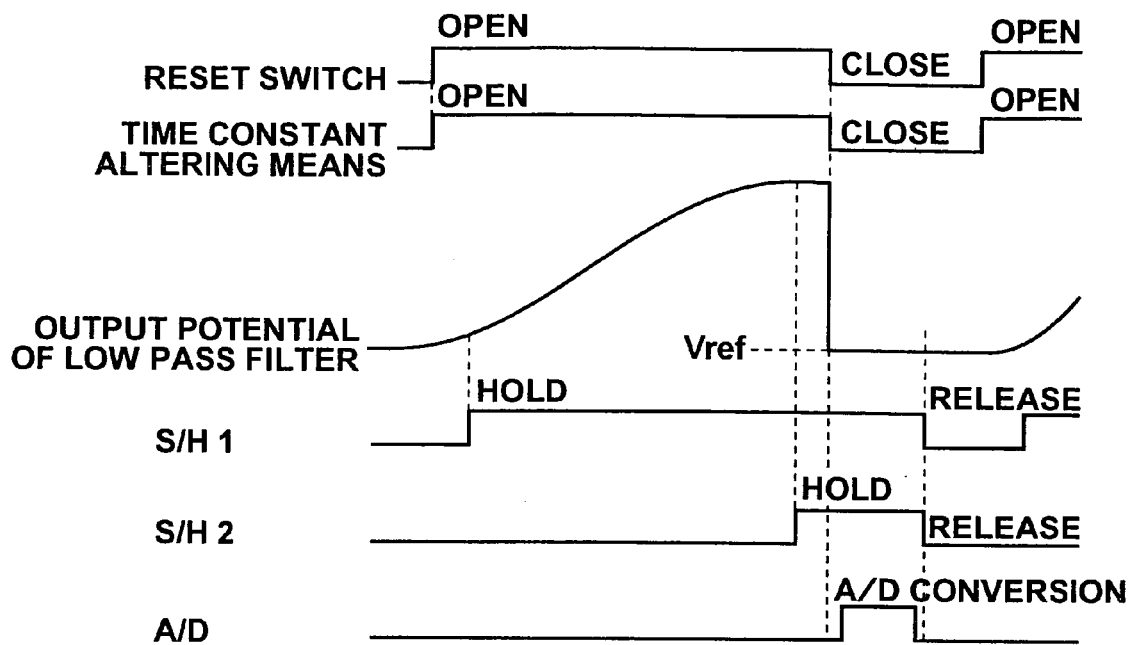
FIG. 4 is a timing chart for illustrating the operational timing of the signal detecting apparatus of the radiation image recording/reading apparatus shown in FIG. 1.

As described above, the reset switch 31b is opened to initiate the integration by the integral amplifier 31, and the integrated electrical signal is inputted to the low pass filter 32. Here, as indicated by the timing chart in FIG. 4, the switch of the time constant altering means 36 is also opened simultaneously with the reset switch 31b. That is, the time constant τ of the low pass filter 32 during this time period is $R_{OFF} \cdot C$. Then, the switch 33a in either of the two sample/hold circuits 33 will be closed immediately after the two switches described above are opened, and a first low-pass-filtered signal will be held by the capacitor 32b of the sample/hold circuit 33 (S/H1 in FIG. 4). Then, after a predetermined time period, the switch 33a of the other sample/hold circuit 33 will be closed, and a second low-pass-filtered signal will be held by the capacitor 32b of that sample/hold circuit (S/H2 in FIG. 4). Then, after the first and second low-pass-filtered signals are held by the two sample/hold circuits, the reset switch 31b of the integral amplifier 31 and the switch of the time constant altering means 36 will be closed simultaneously. This means that the charges stored in the capacitor 31a of the integral amplifier 31 will be discharged, and the time constant τ of the low pass filter 32 will be set extremely small, being $R_{ON} \cdot C$, so that the output potential of the low pass filter 32 will settle immediately to a predetermined potential, Vref, as shown in FIG. 4.

The first and second filtered electrical signals held by the two sample/hold circuits in the manner as described above are outputted to the differential amplifier 34 through the respective buffer amplifiers 33c. Then, the difference between the first and second filtered electrical signals will be calculated in the differential amplifier 34 and outputted to the A/D converter 35. The A/D converter will convert the differential signal of the inputted analog signal to a digital signal and output it as an image signal representing the radiation image.

After the image signal is outputted from the A/D converter 35 in the manner as described above, the switches 33a of the two sample/hold circuits will be opened to discharge the charges stored in the capacitors 32b.

Thereafter, the reset switch 31b will be opened again to initiate the next integration by the integral amplifier 31, and at the same time, the switch of the time constant altering means 36 will also be opened to cause the low pass filter 32 to initiate its operation with the time constant of $R_{OFF} \cdot C$.

The image signal detection described above is performed by each of the signal detecting apparatuses 30 connected to each of the linear electrodes 15a for a single line of the reading light irradiated by the reading light source section 20 to complete the image signal detection for that line. Thereafter, the image signal detection for the subsequent lines of the reading light will be performed in synchronization with the scanning of the linear reading light in Y direction indicated in FIG. 1 by the reading light source section 20 to ultimately detect all image signals from the entire area of the radiation image detector 10.

According to the radiation image recording/reading apparatus of the embodiment described above, the time constant of the low pass filter 32 is altered by the time constant altering means 36 such that the time constant during the time period between the resetting of the integral amplifier and the initiation of the next integration is set smaller than that during the time period between the initiation of the inputting of the integrated electrical signal to the low pass filter and the holding of the filtered electrical signal. This arrangement may reduce the transient response time of the low pass filter 32 during the time period between the resetting of the integral amplifier 31 and the initiation of the next integration. Thus, a sufficient time for the integration is secured and rapid signal reading may be realized with the resultant image signal of improved signal-to-noise ratio.

In the signal detecting apparatus 30 according to the embodiment described above, two sample/hold circuits are provided to implement a so-called correlated double sampling, but the configuration is not necessarily limited to this. Instead, the configuration may be adapted to have only a single sample/hold circuit 32, and the filtered electrical signal is held by this sample/hold circuit 32 at a predetermined timing to detect it as an image signal representing the radiation image. When the signal detecting apparatus 30 is configured to have a single sample/hold circuit 32 as described above, the reset switch 31b of the integral amplifier 31 and the switch of the time constant altering means 36 may be switch on and off in the same manner as described above.

Further, the reset switch 31b of the integral amplifier 31 and the switch of the time constant altering means 36 are preferably switched at the same on/off timings, but they are not necessarily done so.

Figure 5:
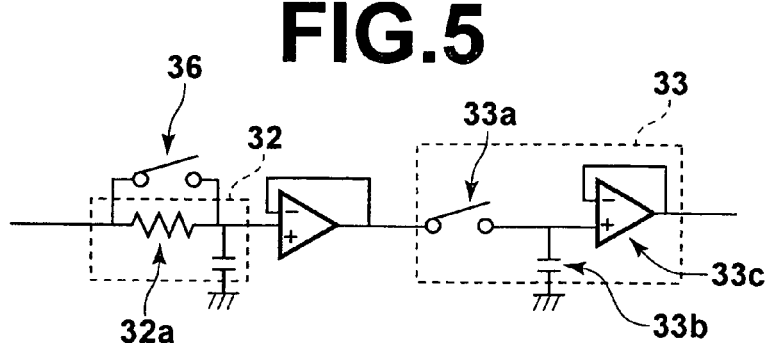
FIG. 5 is a drawing illustrating another embodiment of the signal detecting apparatus of the present invention.

Still further, in the signal detecting apparatus 30 according to the embodiment described above, a single capacitor is shared by the low pass filter 32 and sample/hold circuit 33. However, the configuration is not necessarily limited to this, and the capacitor 32b comprising the low pass filter 32 and a capacitor 33b comprising the sample/hold circuit 33 may be provided separately as shown in FIG. 5.

Figure 6:
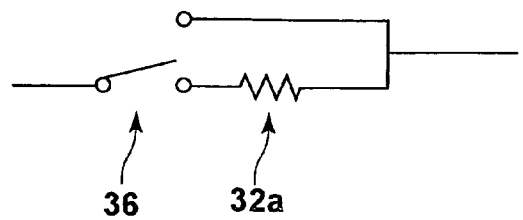
FIG. 6 is a drawing illustrating another embodiment of the time constant altering means of the signal detecting apparatus of the present invention.

Further, in the signal detecting apparatus 30 according to the embodiment described above, a switch is provided as the time constant altering means 36 in parallel to the resistor element 32a, but the configuration is not limited to this. For example, a switch may be provided in series with the resistor element 32a comprising the lowpass filter 32 for switching over between the resistor element 32a and a copper wire to alter the time constant of the low pass filter 32 as shown in FIG. 6.

Still Further, in the radiation image recording/reading apparatus according to the embodiment described above, a radiation image detector of so-called optical reading system is used for outputting the charge signal to be inputted to the signal detecting apparatus 30. The radiation image detectors that may be employed in the radiation image recording/reading apparatus are not limited to this. For example, a radiation image detector of so-called TFT system or a radiation image detector configured to output the charge signal by detecting stimulated luminescence emitted from a storage phosphor sheet with a photoelectrical conversion element may also be used.

Further, the radiation image recording/reading apparatus according to the embodiment comprises the radiation source; radiation image detector 10; reading light source section 20; and signal detecting apparatus 30. However, it may comprise the radiation image detector 10; reading light source section 20; and signal detecting apparatus 30 without the radiation source.

What is claimed is:

1. A signal detecting method for detecting a charge signal outputted from a radiation image detector, which is configured to receive radiation carrying a radiation image to record said image therein and to output a charge signal in accordance with said image recorded therein, as an image signal representing said radiation image, said method comprising the steps of:
   (1) integrating said charge signal outputted from said radiation image detector with an integral amplifier,
   (2) inputting said integrated electrical signal to a low pass filter,
   (3) holding said filtered electrical signal outputted from said low pass filter with a sample/hold circuit to detect said filtered electrical signal as an image signal representing said radiation image,
   (4) resetting said integral amplifier, and
   (5) repeating said steps (1) to (4),
   wherein the time constant of said low pass filter is altered such that said time constant during the time period between said resetting of said integral amplifier and the initiation of the next integration is set smaller than that during the time period between the initiation of said inputting of said integrated electrical signal to said low pass filter and said holding of said filtered electrical signal.

2. A signal detecting apparatus comprising: an integral amplifier for integrating a charge signal outputted from a radiation image detector configured to receive radiation carrying a radiation image to store said image therein and to output a charge signal in accordance with said image recorded therein, a low pass filter for receiving said integrated electrical signal and outputting a filtered electrical signal through filtering of said integrated electrical signal, a sample/hold circuit for holding said filtered electrical signal outputted from said low pass filter to detect said filtered electrical signal as an image signal representing said radiation image, a control circuit for outputting control signals for resetting said integral amplifier after said filtered electrical signal is held by said sample/hold circuit and repeating the steps of said integration by said integral amplifier to said resetting of said integral amplifier, and a time constant altering means for altering the time constant of said low pass filter such that said time constant during the time period between said resetting of said integral amplifier and the initiation of the next integration is set smaller than that during the time period between the initiation of said inputting of said integrated electrical signal to said low pass filter and said holding of said filtered electrical signal.

3. The signal detecting apparatus according to claim 2, wherein said time constant altering means comprises an analog switch arranged in parallel to at least one of the resistor elements comprising said low pass filter.

4. The signal detecting apparatus according to claim 2, wherein said charge signal outputted from said radiation image detector is a charge signal outputted from said detector through the scanning of said detector with reading light.

5. The signal detecting apparatus according to claim 3, wherein said charge signal outputted from said radiation image detector is a charge signal outputted from said detector through the scanning of said detector with reading light.

* * * * *